US011900878B2

(12) United States Patent
Kim et al.

(10) Patent No.: US 11,900,878 B2
(45) Date of Patent: Feb. 13, 2024

(54) DISPLAY DEVICE

(71) Applicant: Samsung Display Co., Ltd., Yongin-si (KR)

(72) Inventors: Yoon-Ho Kim, Seongnam-si (KR); Jeong-Young Kim, Yongin-si (KR); Dongwan Park, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/095,721

(22) Filed: Jan. 11, 2023

(65) Prior Publication Data

US 2023/0386404 A1 Nov. 30, 2023

(30) Foreign Application Priority Data

May 30, 2022 (KR) ........................ 10-2022-0065975

(51) Int. Cl.
*G09G 3/3233* (2016.01)

(52) U.S. Cl.
CPC ... *G09G 3/3233* (2013.01); *G09G 2300/0413* (2013.01); *G09G 2300/0819* (2013.01); *G09G 2300/0842* (2013.01); *G09G 2300/0861* (2013.01); *G09G 2310/08* (2013.01); *G09G 2330/027* (2013.01)

(58) Field of Classification Search
None
See application file for complete search history.

(56) References Cited

U.S. PATENT DOCUMENTS

| | | | | |
|---|---|---|---|---|
| 9,256,109 B2 * | 2/2016 | Kang | .................. | H10K 59/131 |
| 2007/0279343 A1 * | 12/2007 | Kim | .................... | G09G 3/3258 345/77 |
| 2008/0030495 A1 * | 2/2008 | Shirasaki | ............ | G09G 3/3233 345/78 |

(Continued)

FOREIGN PATENT DOCUMENTS

| | | |
|---|---|---|
| KR | 101281681 B1 | 7/2013 |
| KR | 1020190009856 A | 1/2019 |

(Continued)

*Primary Examiner* — Fred Tzeng
(74) *Attorney, Agent, or Firm* — CANTOR COLBURN LLP

(57) ABSTRACT

A display device includes a display panel including first to $(m*n-1)^{th}$ pixel rows and a dummy pixel row, where each of m and n is a natural number greater than or equal to 2, an emission driver which provides emission signals to the first to $(m*n-1)^{th}$ pixel rows and the dummy pixel row, and a timing controller which provides an emission start signal and a dummy start signal to the emission driver. Each of the emission signals includes a plurality of on-periods and a plurality of off-periods in one frame period, and time points of off-periods of an emission signal provided to the dummy pixel row are the same as time points of off-periods of an emission signal provided to each of $k*n^{th}$ pixel rows, where k is a natural number greater than or equal to 1 and less than m.

20 Claims, 9 Drawing Sheets

(56) References Cited

U.S. PATENT DOCUMENTS

2008/0238953 A1* 10/2008 Ogura .................. G09G 3/3275 345/697
2009/0244044 A1* 10/2009 Furuichi .............. G09G 3/3283 345/211
2011/0007102 A1* 1/2011 Ogura .................. G09G 3/3291 345/690
2011/0157133 A1* 6/2011 Ogura .................. G09G 3/3291 345/82
2011/0157134 A1* 6/2011 Ogura ...................... G09G 3/20 345/82
2015/0108437 A1* 4/2015 Cho ..................... G09G 3/3233 257/40
2015/0130787 A1* 5/2015 Chung ................. G09G 3/3225 345/76
2015/0262526 A1* 9/2015 Park ..................... G09G 3/3233 345/76
2015/0364116 A1* 12/2015 Kong ................... G09G 3/3233 345/82
2016/0321990 A1* 11/2016 Kim ..................... G09G 3/3233
2019/0027093 A1* 1/2019 Choi .................... G09G 3/3233
2020/0175912 A1* 6/2020 Lee ...................... G09G 3/3225
2020/0243016 A1* 7/2020 Park ..................... G09G 3/3266
2020/0302875 A1* 9/2020 Park ..................... G09G 3/3275
2021/0327368 A1* 10/2021 Park ................... H10K 59/1216
2022/0270542 A1* 8/2022 Park ......................... G09G 3/32
2022/0366835 A1* 11/2022 Park ..................... G09G 3/3233
2023/0215364 A1* 7/2023 Lim ..................... G09G 3/3233 345/691

FOREIGN PATENT DOCUMENTS

KR 1020200030431 A 3/2020
KR 1020210015912 A 2/2021

* cited by examiner

DISPLAY DEVICE

This application claims priority to Korean Patent Application No. 10-2022-0065975, filed on May 30, 2022, and all the benefits accruing therefrom under 35 U.S.C. § 119, the content of which in its entirety is herein incorporated by reference.

BACKGROUND

1. Field

Embodiments relate to a display device. More particularly, embodiments relate to a display device driven by an impulsive driving method.

2. Description of the Related Art

A display device may include a display panel including pixel rows, each including pixels, a gate driver for sequentially providing gate signals to the pixel rows, and a data driver for providing a data voltage to the pixel rows to which the gate signal is provided. The display device may further include an emission driver for sequentially providing emission signals to the pixel rows.

SUMMARY

In a display device, an emission signal provided from an emission driver may include a plurality of emission periods in one frame period, and the emission period may include an on-period and an off-period. When the number of off-periods of the emission signal is different between pixel rows during one frame period, horizontal lines may be generated in the display device, and accordingly, image quality of the display device may be degraded.

Embodiments provide a display device that effectively prevents degradation of image quality although the number of off-periods of an emission signal is different between pixel rows.

A display device according to embodiments includes a display panel including first to $(m*n-1)^{th}$ pixel rows and a dummy pixel row, where each of m and n is a natural number greater than or equal to 2, an emission driver which provides emission signals to the first to $(m*n-1)^{th}$ pixel rows and the dummy pixel row, and a timing controller which provides an emission start signal and a dummy start signal to the emission driver. In such embodiments, each of the emission signals may include a plurality of on-periods and a plurality of off-periods in one frame period. In such embodiments, time points of off-periods of an emission signal provided to the dummy pixel row are the same as time points of off-periods of an emission signal provided to each of $k*n^{th}$ pixel rows, where k is a natural number greater than or equal to 1 and less than m.

In an embodiment, the first to $(m*n-1)^{th}$ pixel rows may be disposed in a display area of the display panel. In such an embodiment, the dummy pixel row may be disposed in a non-display area of the display panel.

In an embodiment, the dummy pixel row may be adjacent to the first pixel row.

In an embodiment, each of the first to $(m*n-1)^{th}$ pixel rows may include a pixel including a light emitting element. In such an embodiment, the light emitting element may emit light during the on-periods, and may not emit light during the off-periods.

In an embodiment, each of the emission signals may include a plurality of emission periods in the one frame period. In such an embodiment, each of the emission periods may include one of the on-periods and one of the off-periods.

In an embodiment, the each of the emission signals may include four emission period in the one frame period s.

In an embodiment, the each of the emission signals may include two emission periods in the one frame period.

In an embodiment, the each of the emission signals may include eight emission period in the one frame period s.

In an embodiment, a voltage level of each of the emission signals in the off-periods may be higher than a voltage level of each of the emission signals in the on-periods.

In an embodiment, the emission driver may include first to $(m*n-1)^{th}$ stages connected to the first to $(m*n-1)^{th}$ pixel rows, respectively, and a dummy stage connected to the dummy pixel row. In such an embodiment, the timing controller may provide the emission start signal to the first stage and provides the dummy start signal to the dummy stage.

In an embodiment, each of the emission start signal and the dummy start signal may include a plurality of on-periods and a plurality of off-periods in the one frame period. In such an embodiment, time points of off-periods of the dummy start signal may be different from time points of off-periods of the emission start signal.

In an embodiment, widths of the off-periods of the dummy start signal may be greater than widths of the off-periods of the emission start signal.

A display device according to embodiments includes a display panel including first to $(m*n-1)^{th}$ pixel rows, where each of m and n is a natural number greater than or equal to 2, an emission driver which provides emission signals to the first to $(m*n-1)^{th}$ pixel rows, and a timing controller which provides an emission start signal to the emission driver. In such embodiments, each of the emission signals includes a plurality of on-periods and a plurality of off-periods in one frame period. In such embodiments, widths of off-periods of an emission signal provided to each of $k*n^{th}$ pixel rows are different from widths of off-periods of an emission signal provided to each of remaining pixel rows other than the $k*n^{th}$ pixel rows among the first to $(m*n-1)^{th}$ pixel rows, where k is a natural number greater than or equal to 1 and less than m.

In an embodiment, the widths of the off-periods of the emission signal provided to each of the $k*n^{th}$ pixel rows may be greater than the widths of the off-periods of the emission signal provided to each of the remaining pixel rows.

In an embodiment, each of the first to $(m*n-1)^{th}$ pixel rows may include a pixel including a light emitting element. In such an embodiment, the light emitting element may emit light during the on-periods, and may not emit light during the off-periods.

In an embodiment, each of the emission signals may include a plurality of emission periods in the one frame period. In such an embodiment, each of the emission periods may include one of the on-periods and one of the off-periods.

In an embodiment, the each of the emission signals may include four emission periods in the one frame period.

In an embodiment, the each of the emission signals may include two emission periods in the one frame period.

In an embodiment, the each of the emission signals may include eight emission periods in the one frame period.

In an embodiment, a voltage level of each of the emission signals in the off-periods may be higher than a voltage level of each of the emission signals in the on-periods.

In the display device according to embodiments, as described herein, although the number of the off-periods of the emission signal provided to some pixel rows is different from the number of the off-periods of the emission signal provided to the remaining pixel rows, the emission signal may be additionally provided to the dummy pixel row, or the widths of the off-periods of the emission signal provided to some pixel rows may be adjusted, so that degradation of image quality of the display device may be effectively prevented.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
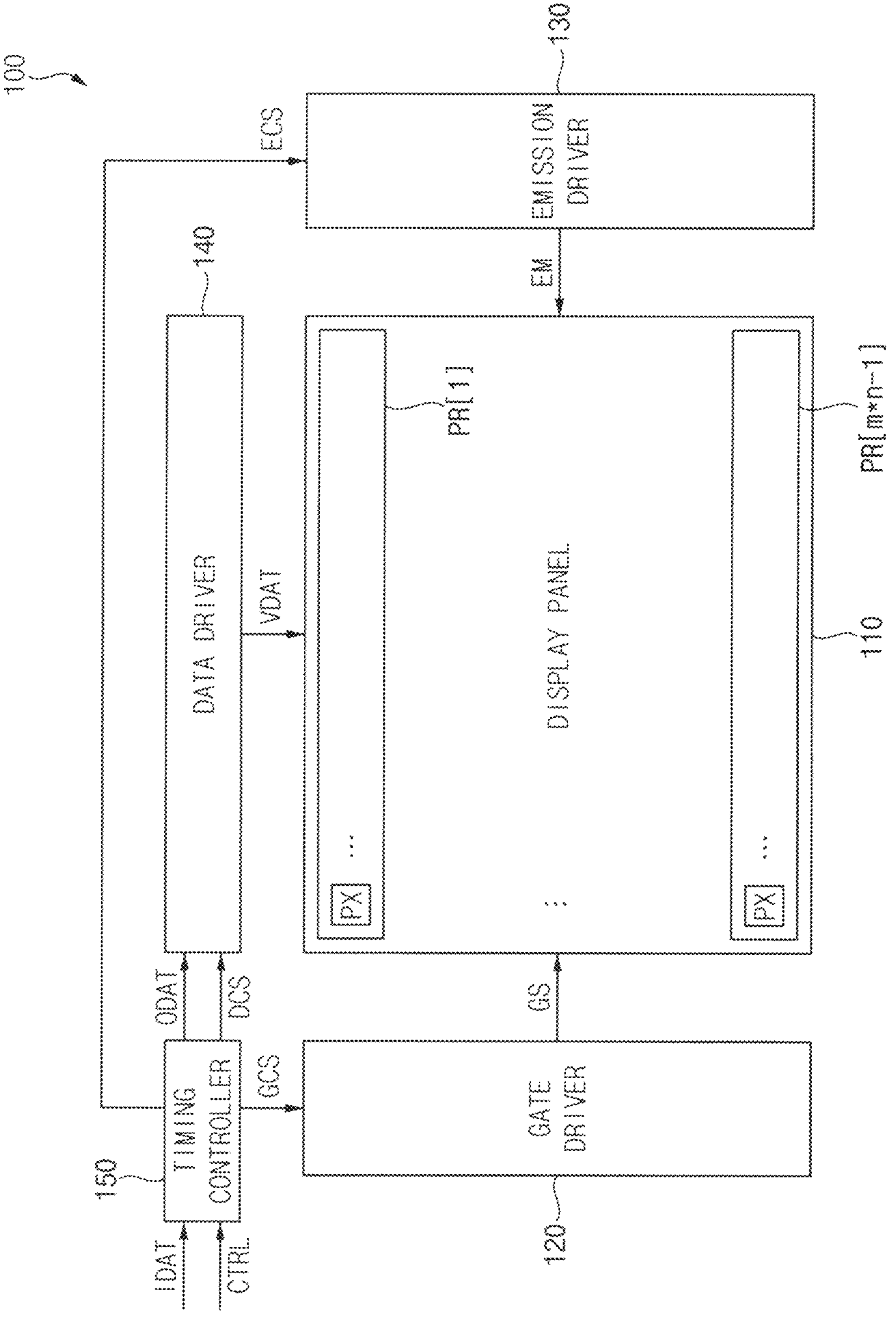
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device according to embodiments will be described in detail with reference to the accompanying drawings.

FIG. 1 is a block diagram illustrating a display device 100 according to an embodiment.

Referring to FIG. 1, an embodiment of the display device 100 may include a display panel 110, a gate driver 120, an emission driver 130, a data driver 140, and a timing controller 150.

The display panel 110 may include a display element such as an organic light emitting diode ("OLED") or the like. Hereinafter, embodiments where the display panel 110 includes the OLED as the display element will be described for convenience. However, the disclosure is not limited thereto, and the display panel 110 may include other various display elements such as a liquid crystal display ("LCD") element, an electrophoretic display ("EPD") element, an inorganic light emitting diode, a quantum-dot light emitting diode ("QLED"), or the like.

The display panel 110 may include a plurality of pixels PX. The pixels PX may receive gate signals GS, emission signals EM, and data voltages VDAT. The pixels PX may emit light based on the gate signals GS, the emission signals EM, and the data voltages VDAT.

The display panel 110 may include first to $(m*n-1)^{th}$ pixel rows PR[1]-PR[m*n−1], where each of m and n is a natural number greater than or equal to 2.

Here, m may be determined based on (or to correspond to) the number of emission periods included in each of the emission signals EM in one frame period. Each of the pixel rows PR[1]-PR[m*n−1] may include a plurality of pixels PX.

The gate driver 120 may generate the gate signals GS based on a gate control signal GCS from the timing controller 150, and may provide the gate signals GS to the pixels PX. The gate control signal GCS may include a gate start signal, a gate clock signal, or the like. The gate driver 120 may sequentially provide the gate signals GS to the pixel rows PR[1]-PR[m*n−1], respectively.

The emission driver 130 may generate the emission signals EM based on an emission control signal ECS from the timing controller 150, and may provide the emission signals EM to the pixels PX. The emission control signal ECS may include an emission start signal, an emission clock signal, or the like. In an embodiment, the emission control signal ECS may further include a dummy start signal. The emission driver 130 may sequentially provide the emission signals EM to the pixel rows PR[1]-PR[m*n−1], respectively.

The data driver 140 may generate the data voltages VDAT based on output image data ODAT and a data control signal DCS from the timing controller 150, and may provide the data voltages VDAT to the pixels PX. The data control signal DCS may include a data clock signal, a data enable signal, or the like.

The timing controller 150 may control driving of the gate driver 120, driving of the emission driver 130, and driving of the data driver 140. The timing controller 150 may generate the output image data ODAT, the gate control signal GCS, the emission control signal ECS, and the data control signal DCS based on input image data IDAT and a control signal CTR from an outside (or an external device). The timing controller 150 may provide the gate control signal GCS to the gate driver 120, may provide the emission control signal ECS to the emission driver 130, and may provide the output image data ODAT and the data control signal DCS to the data driver 140. The control signal CTR may include a vertical synchronization signal, a horizontal synchronization signal, a clock signal, or the like.

The display device 100 may display an image by a variable refresh rate ("VRR") method capable of changing an image refresh rate. The image refresh rate may indicate a frequency of displaying images from the display device 100 for one second.

The display device 100 may control an output frequency of the gate driver 120 and an output frequency of the data driver 140 according to driving conditions. In an embodiment, the display device 100 may display an image at various image refresh rates in a range from 1 hertz (Hz) to 120 Hz. In an alternative embodiment, the display device 100 may display an image at an image refresh rate greater than 120 Hz (e.g., 240 Hz or 480 Hz).

Figure 2:
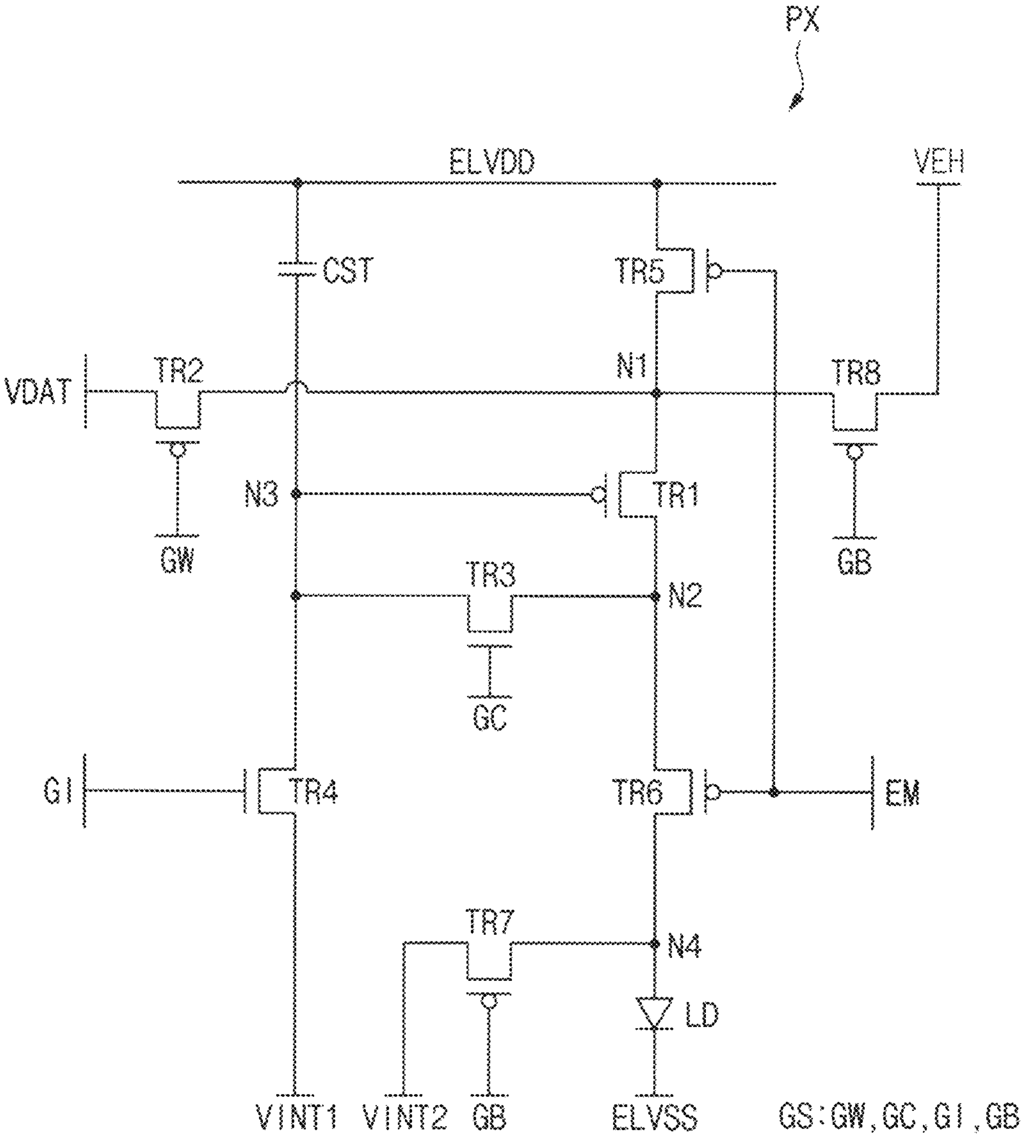
FIG. 2 is a circuit diagram illustrating an embodiment of a pixel included in the display device in FIG. 1.

FIG. 2 is a circuit diagram illustrating an embodiment of the pixel PX included in the display device 100 in FIG. 1.

Referring to FIG. 2, an embodiment of the pixel PX may include a first transistor TR1, a second transistor TR2, a third transistor TR3, a fourth transistor TR4, a fifth transistor TR5, a sixth transistor TR6, a seventh transistor TR7, an eighth transistor TR8, a storage capacitor CST, and a light emitting element LD. The gate signal GS may include a write gate signal GW, a compensation gate signal GC, an initialization gate signal GI, and a bypass gate signal GB.

A first electrode of the first transistor TR1 may be connected to a first node N1, and a second electrode of the first transistor TR1 may be connected to a second node N2. A gate electrode of the first transistor TR1 may be connected to a third node N3.

A first electrode of the second transistor TR2 may receive the data voltage VDAT, and a second electrode of the second transistor TR2 may be connected to the first node N1. A gate electrode of the second transistor TR2 may receive the write gate signal GW.

A first electrode of the third transistor TR3 may be connected to the second node N2, and a second electrode of the third transistor TR3 may be connected to the third node N3. A gate electrode of the third transistor TR3 may receive the compensation gate signal GC.

A first electrode of the fourth transistor TR4 may receive a first initialization voltage VINT1, and a second electrode of the fourth transistor TR4 may be connected to the third node N3. A gate electrode of the fourth transistor TR4 may receive the initialization gate signal GI.

A first electrode of the fifth transistor TR5 may receive a first power voltage ELVDD, and a second electrode of the fifth transistor TR5 may be connected to the first node N1. Agate electrode of the fifth transistor TR5 may receive the emission signal EM.

A first electrode of the sixth transistor TR6 may be connected to the second node N2, and a second electrode of the sixth transistor TR6 may be connected to a fourth node N4. Agate electrode of the sixth transistor TR6 may receive the emission signal EM.

A first electrode of the seventh transistor TR7 may receive a second initialization voltage VINT2, and a second electrode of the seventh transistor TR7 may be connected to the fourth node N4. A gate electrode of the seventh transistor TR7 may receive the bypass gate signal GB.

A first electrode of the eighth transistor TR8 may receive a bias voltage VEH, and a second electrode of the eighth transistor TR8 may be connected to the first node N1. A gate electrode of the eighth transistor TR8 may receive the bypass gate signal GB.

FIG. 2 illustrates an embodiment where each of the first transistor TR1, the second transistor TR2, the fifth transistor TR5, the sixth transistor TR6, the seventh transistor TR7, and the eighth transistor TR8 is a P-type transistor and each of the third transistor TR3 and the fourth transistor TR4 is an N-type transistor, but the disclosure is not limited thereto. In an alternative embodiment, at least one selected from the first transistor TR1, the second transistor TR2, the fifth transistor TR5, the sixth transistor TR6, the seventh transistor TR7, and the eighth transistor TR8 may be the N-type transistor, or at least one selected from the third transistor TR3 and the fourth transistor TR4 may be the P-type transistor.

A first electrode of the storage capacitor CST may be connected to the third node N3, and a second electrode of the storage capacitor CST may receive the first power voltage ELVDD.

A first electrode of the light emitting element LD may be connected to the fourth node N4, and a second electrode of the light emitting element LD may receive a second power voltage ELVSS.

In the operation of the pixel PX, first, when the fourth transistor TR4 is turned on in response to the initialization gate signal GI, the first initialization voltage VINT1 may be applied to the third node N3. Then, when the third transistor TR3 is turned on in response to the compensation gate signal GC and the second transistor TR2 is turned on in response to the write gate signal GW, the data voltage VDAT for which a threshold voltage of the first transistor TR1 is compensated may be stored in the storage capacitor CST. Then, when the seventh transistor TR7 and the eighth transistor TR8 are turned on in response to the bypass gate signal GB, the second initialization voltage VINT2 and the bias voltage VEH may be applied to the fourth node N4 and the first node N1, respectively. Then, when the fifth transistor TR5 and the sixth transistor TR6 are turned on in response to the emission signal EM, a driving current may flow through the first transistor TR1 based on the data voltage VDAT stored in the storage capacitor CST, and the light emitting element LD may emit light as the driving current flows through the light emitting element LD.

Figure 3:
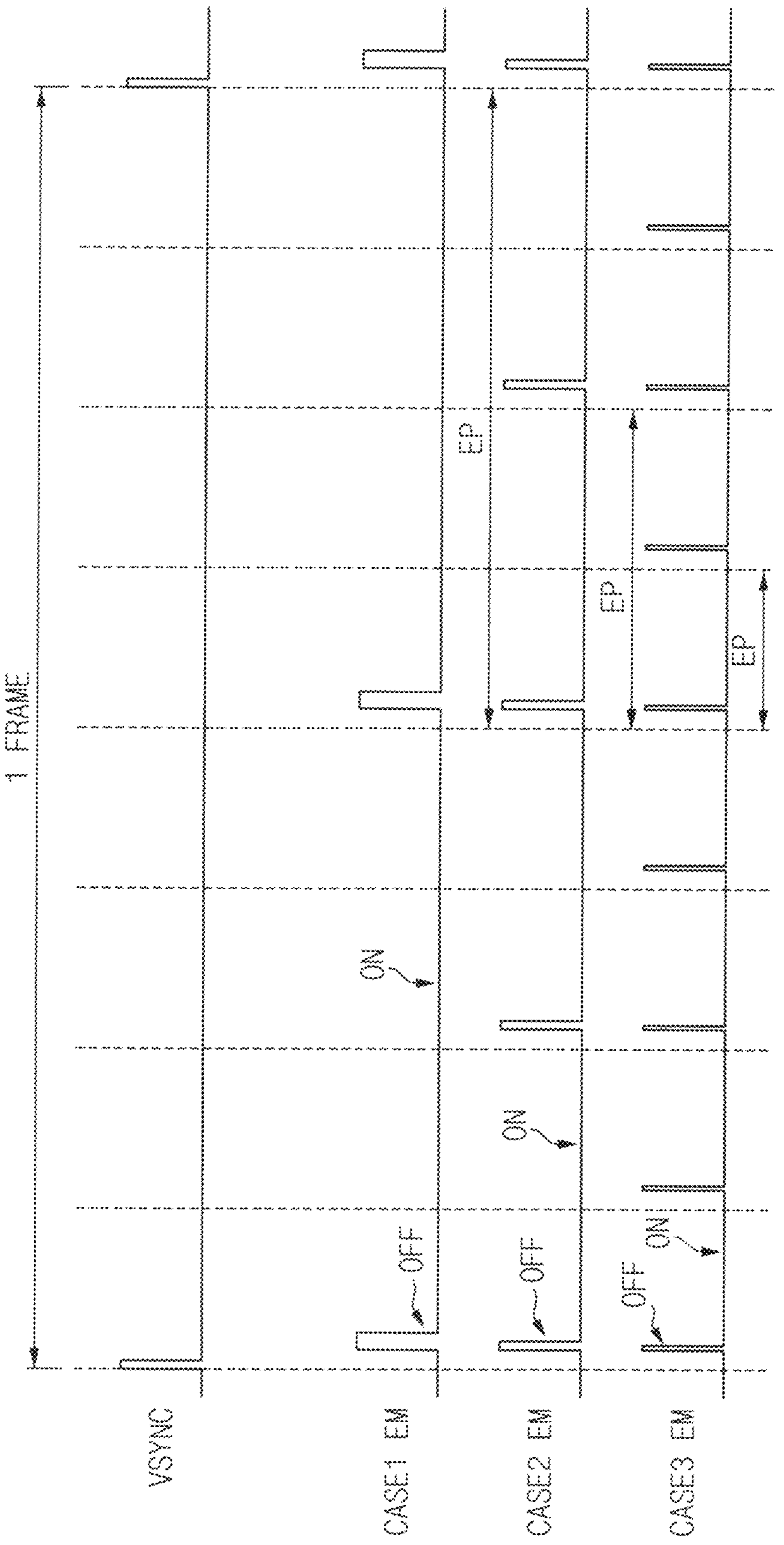
FIG. 3 is a timing diagram for describing that the display device in FIG. 1 is driven by an impulsive driving method.

FIG. 3 is a timing diagram for describing that the display device 100 in FIG. 1 is driven by an impulsive driving method.

Referring to FIGS. 1, 2, and 3, the display device 100 may use an impulsive driving method in which the light emitting element LD included in the pixel PX emits light in response to the emission signal EM in a frame period. For convenience of description, in FIG. 3, it is assumed that the frame period is synchronized by the vertical synchronization signal VSYNC, and the light emitting element LD emits light in all on-periods ON of the emission signal EM included in the frame period.

The light emitting element LD may emit light one or more times during one frame period (represented by 1 FRAME) in response to the emission signal EM. The emission signal EM may include successive emission periods EP, and each of the emission periods EP may include an off-period OFF and an on-period ON.

A starting point of the emission period EP of the emission signal EM may be a rising edge at which the emission signal EM is switched from the on-period ON to the off-period OFF. The fifth transistor TR5 and the sixth transistor TR6 may be turned on during the on-period ON of the emission signal EM so that the light emitting element LD may emit light, and the fifth transistor TR5 and the sixth transistor TR6 may be turned off during the off-period OFF of the emission signal EM so that the light emitting element LD may not emit light. As illustrated in FIG. 2, when each of the fifth transistor TR5 and the sixth transistor TR6 is the P-type transistor, a voltage level of the emission signal EM in the off-period OFF may be higher than a voltage level of the emission signal EM in the on-period ON.

In an embodiment (e.g., in a first case CASE1 in FIG. 3), the emission signal EM may include two emission periods EP in one frame period. In other words, in the first case CASE1, the light emitting element LD may emit light twice in one frame period. In such an embodiment, the display panel 110 may include first to $(2n-1)^{th}$ pixel rows PR[1]-PR[2n−1].

In an alternative embodiment (e.g., in a second case CASE2 in FIG. 3), the emission signal EM may include four emission periods EP in one frame period. In other words, in the second case CASE2, the light emitting element LD may emit light four times in one frame period. In such an embodiment, the display panel 110 may include first to $(4n-1)^{th}$ pixel rows PR[1]-PR[4n−1].

In still another alternative embodiment (e.g., in a third case CASE3 in FIG. 3), the emission signal EM may include eight emission periods EP in one frame period. In other words, in the third case CASE3, the light emitting element LD may emit light eight times in one frame period. In such an embodiment, the display panel 110 may include first to $(8n-1)^{th}$ pixel rows PR[1]-PR[8n−1].

Since the number of the on-periods ON of the emission signal EM included in one frame period (represented by 1 FRAME) increases from the first case CASE1 to the third case CASE3, the number of times the light emitting element LD emits light may increase during one frame period. However, since the length of each of the on-periods ON of the emission signal EM included in one frame period (represented by 1 FRAME) decreases from the first case CASE1 to the third case CASE3, the duration of one emission during which the light emitting element LD emits light in one frame period may decrease. Accordingly, the sum of the lengths of the on-periods ON included in one frame period may be substantially the same in all cases CASE1-CASE3. When substantially the same data voltage VDAT is applied to the pixel PX, the luminance of the pixel PX may be substantially the same in all cases CASE1-CASE3.

One frame period may be defined as an emission starting point where one emission period EP of the emission signal EM starts to an emission start point where another emission period EP of the emission signal EM starts, however, it should be understood that 1 FRAME synchronized by the vertical synchronization signal VSYNC is represented in FIG. 3 for convenience. Further, in FIG. 3, it should be understood that each of the frame period illustrated as the first case CASE1, the frame period illustrated as the second case CASE2, and the frame period illustrated as the third case CASE3 is illustrated based on one pixel row of the display panel 110. In other words, since the gate signal GS and the emission signal EM are sequentially applied to the plurality of pixel rows of the display panel 110, it should be understood that the frame period is sequentially shifted along the plurality of pixel rows of the display panel 110. For example, since the emission signals EM respectively illustrated in the cases CASE1-CASE3 in FIG. 3 are for one pixel row, (m*n−1) emission signals EM sequentially shifted by a predetermined time while having substantially the same shape may exist to drive (m*n−1) pixel rows PR[1]-PR[m*n−1].

Figure 4:
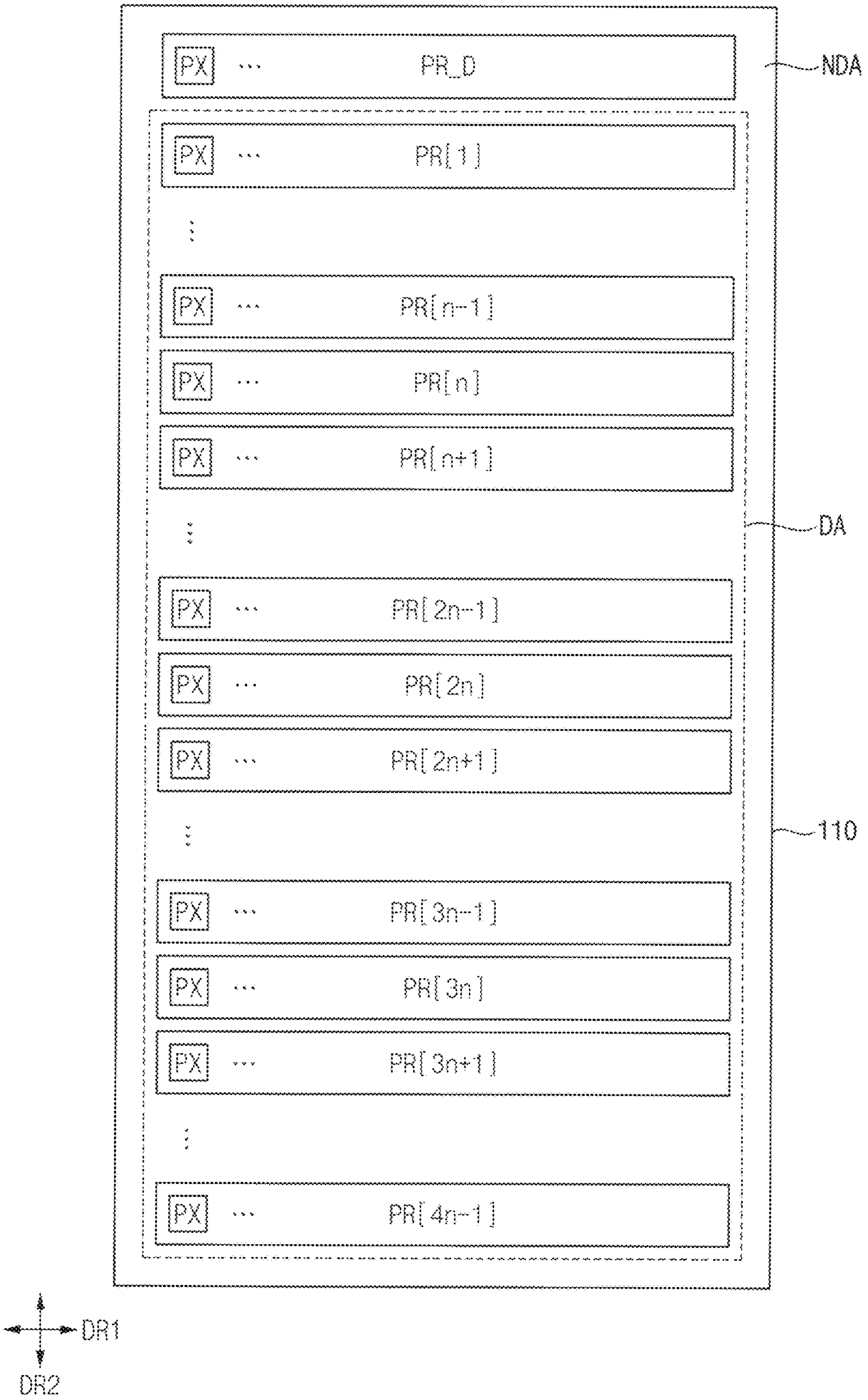
FIG. 4 is a plan view illustrating an embodiment of a display panel included in the display device in FIG. 1.
Figure 5:
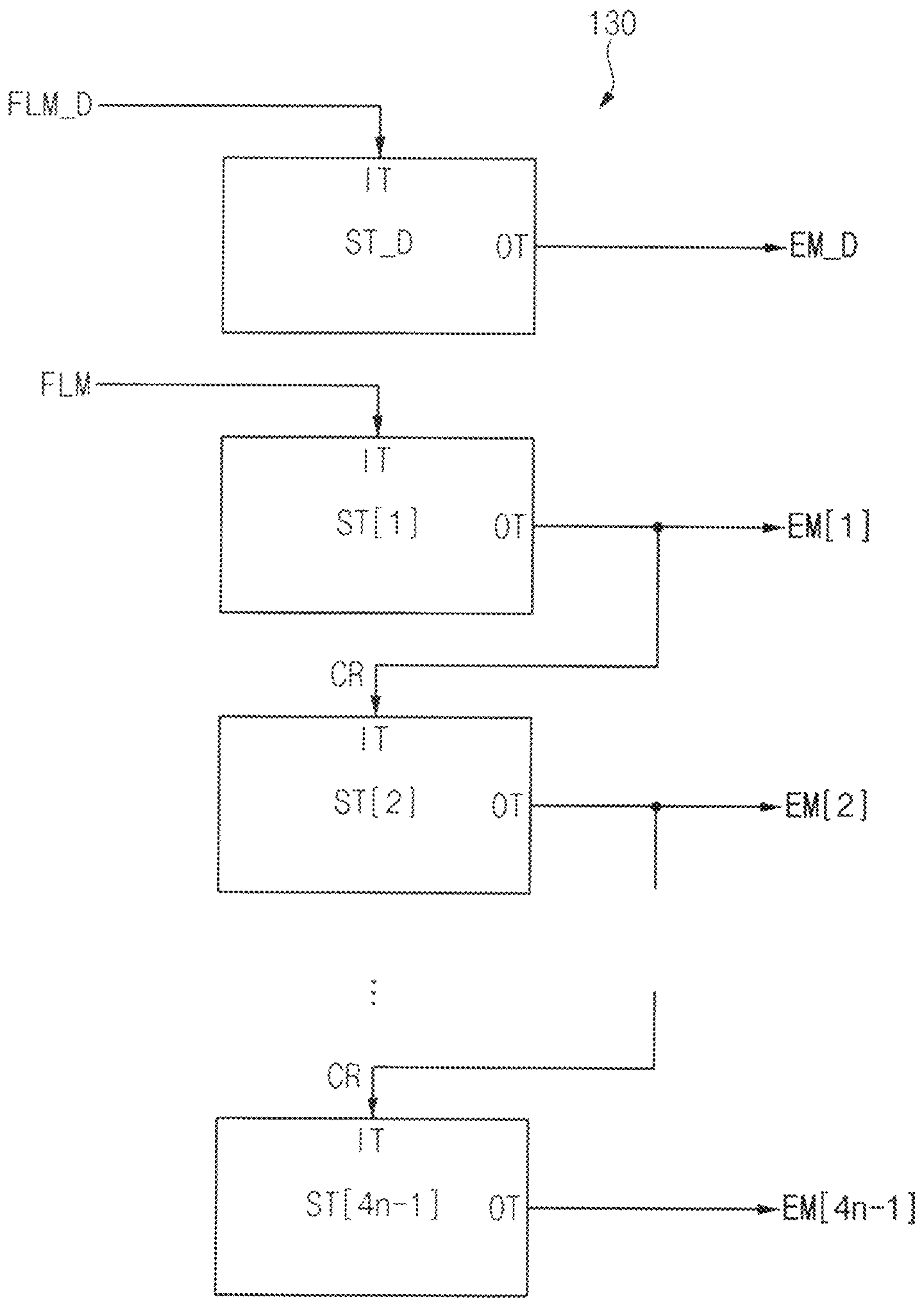
FIG. 5 is a block diagram illustrating an embodiment of an emission driver included in the display device in FIG. 1.
Figure 6:
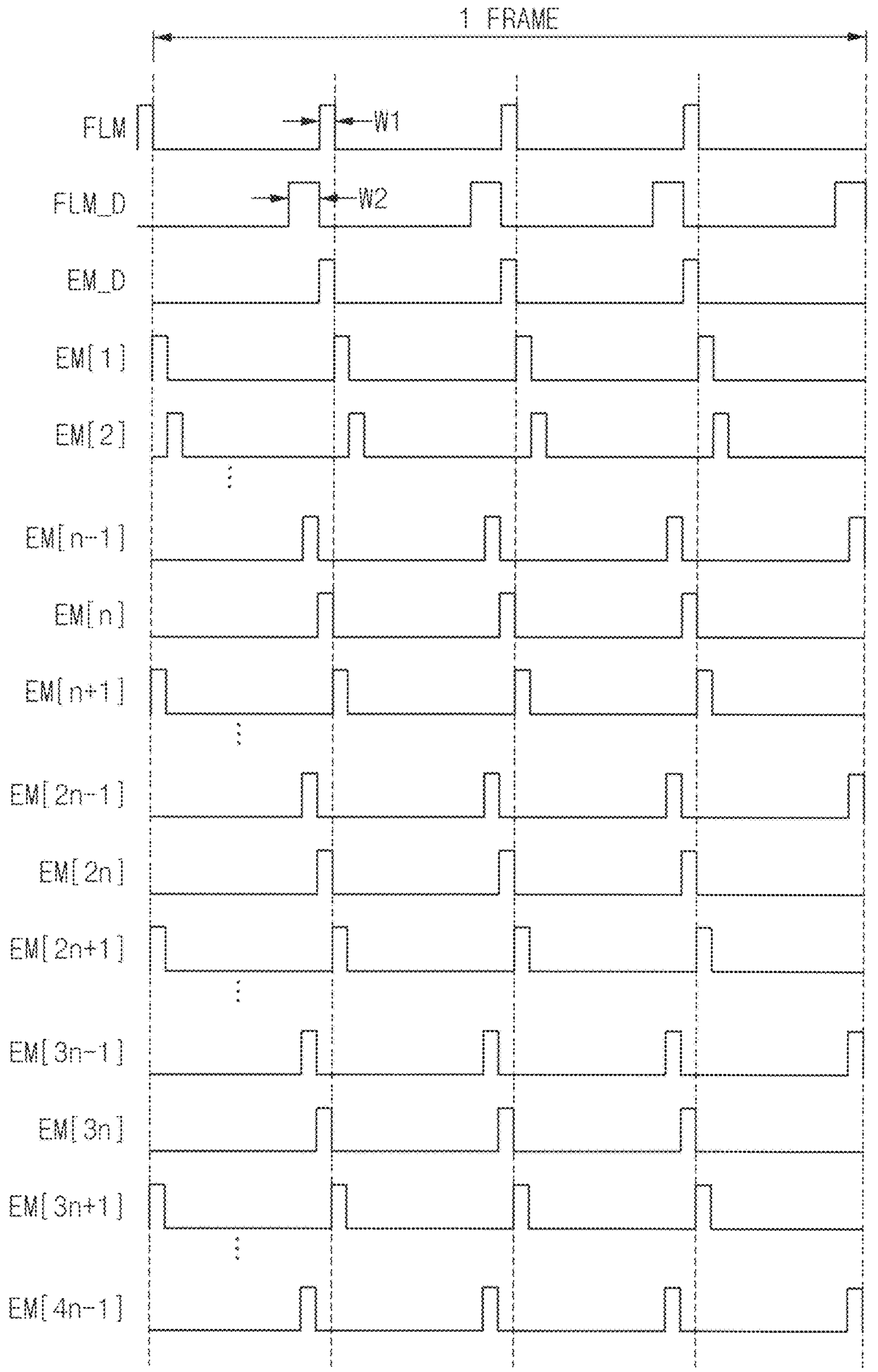
FIG. 6 is a timing diagram for describing an emission start signal, a dummy start signal, and emission signals according to an embodiment.

FIG. 4 is a plan view illustrating an embodiment of the display panel 110 included in the display device 100 in FIG. 1. FIG. 5 is a block diagram illustrating an embodiment of the emission driver 130 included in the display device in FIG. 1. FIG. 6 is a timing diagram for describing an emission start signal FLM, a dummy start signals FLM_D, and emission signals EM_D, EM[1]-EM[4n−1] according to an embodiment.

Hereinafter, with reference to FIGS. 4 to 6, an embodiment in which m is 4 (e.g., a case in which the emission signal EM includes four emission periods EP in one frame period, that is, the second case CASE2 in FIG. 3) will be mainly described, but the features described with reference to FIGS. 4 to 6 may be applied to other cases where m is 2, 3, or 5 or more.

Referring to FIGS. 1 and 4, an embodiment of the display panel 110 may include a display area DA and a non-display area NDA. The display area DA may be an area in which an image is displayed from the display panel 110, and the non-display area NDA may be an area in which an image is not displayed from the display panel 110. In an embodiment, the non-display area NDA may surround the display area DA.

The display panel 110 may include first to $(4n-1)^{th}$ pixel rows PR[1]-PR[4n−1] and a dummy pixel row PR_D. The first to $(4n-1)^{th}$ pixel rows PR[1]-PR[4n−1] may be disposed in the display area DA. Each of the first to $(4n-1)^{th}$ pixel rows PR[1]-PR[4n−1] may extend in a first direction DR1, and the first to $(4n-1)^{th}$ pixel rows PR[1]-PR[4n−1]) may be arranged in a second direction DR2 crossing the first direction DR1. Each of the first to $(4n-1)^{th}$ pixel rows PR[1]-PR[4n−1] may include a plurality of pixels PX. The pixels PX included in each of the first to $(4n-1)^{th}$ pixel rows PR[1]-PR[4n−1] may emit light in response to the emission signals EM.

The dummy pixel row PR_D may be disposed in the non-display area NDA. The dummy pixel row PR_D may extend in the first direction DR1, and may be adjacent to the first pixel row PR[1]. In an embodiment, for example, the dummy pixel row PR_D may be adjacent to the second direction DR2 from the first pixel row PR[1]. The dummy pixel row PR_D may include a plurality of pixels PX. The pixels PX included in the dummy pixel row PR_D may not emit light in response to the emission signals EM.

Referring to FIG. 5, an embodiment of the emission driver 130 may include first to $(4n-1)^{th}$ stages ST[1]-ST[4n−1] and a dummy stage ST_D.

The first to $(4n-1)^{th}$ stages ST[1]-ST[4n−1] may be connected to the first to $(4n-1)^{th}$ pixel rows PR[1]-PR[4n−1], respectively. The first to $(4n-1)^{th}$ stages ST[1]-ST[4n−1] may provide first to $(4n-1)^{th}$ emission signals EM[1]-EM[4n−1] to the first to $(4n-1)^{th}$ pixel rows PR[1]-PR[4n−1], respectively.

The timing controller 150 may provide an emission start signal FLM to the first stage ST[1]. An input terminal IT of the first stage ST[1] may receive the emission start signal FLM, and an output terminal OT of the first stage ST[1] may output a first emission signal EM[1] generated in response to the emission start signal FLM and the emission clock signal. An input terminal IT of the second stage ST[2] may receive the first emission signal EM[1] from the first stage ST[1] as a carry signal CR, and an output terminal of the second stage ST[2] may output a second emission signal EM[2] generated in response to the first emission signal EM[1] and the emission clock signal. An input terminal IT of the $(4n-1)^{th}$ stage ST[4n−1] may receive a $(4n-2)^{th}$ emission signal from the $(4n-2)^{th}$ stage ST[4n−2] as the carry signal CR, and an output terminal of the $(4n-1)^{th}$ stage ST[4n−1] may output a $(4n-1)^{th}$ emission signal EM[4n−1] generated in response to the $(4n-2)^{th}$ emission signal and the emission clock signal.

The dummy stage ST_D may be connected to the dummy pixel row PR_D. The dummy stage ST_D may provide the dummy emission signal EM_D to the dummy pixel row PR_D.

The timing controller 150 may provide a dummy start signal FLM_D to the dummy stage ST_D. An input terminal IT of the dummy stage ST_D may receive the dummy start signal FLM_D, and an output terminal OT of the dummy stage ST_D may output the dummy emission signal EM_D in response to the dummy start signal FLM_D and the emission clock signal.

Referring to FIG. 6, the first to $(4n-1)^{th}$ emission signals EM[1]-EM[4n−1] having substantially the same shape and sequentially shifted by a predetermined time may be provided to the first to $(4n-1)^{th}$ pixel rows PR[1]-PR[4n−1], respectively. The emission start signal FLM may include four on-periods and four off-periods in one frame period, and the first to $(4n-1)^{th}$ emission signals EM[1]-EM[4n−1] may be signals in which the emission start signal FLM is sequentially shifted by a predetermined time.

During one frame period, each of $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1] may include four off-periods, and each of $k*n^{th}$ emission signals EM[n], EM[2n], and EM[3n] may include three off-periods, where k is a natural number greater than or equal to 1 and less than m (=4)). When the number of the off-periods of each of the $k*n^{th}$ emission signals EM[n], EM[2n], EM[3n] is different from the number of the off-periods of each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1], a load of the display panel 110 at time points of the off-periods of each of the $k*n^{th}$ emission signals EM[n], EM[2n], and EM[3n] may be different from a load of the display panel 110 at time points of the off-periods of each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1]. Accordingly, horizontal lines generated in the $k*n^{th}$ pixel rows PR[n], PR[2n], and PR[3n] may be recognized.

In an embodiment, the dummy emission signal EM_D may be provided to the dummy pixel row PR_D, and time points of the off-periods of the dummy emission signal EM_D provided to the dummy pixel row PR_D may be substantially the same as the time points of the off-periods of each of the $k*n^{th}$ emission signals EM[n], EM[2n], and EM[3n] respectively provided to the $k*n^{th}$ pixel rows PR[n], PR[2n], and PR[3n] such that the horizontal lines may be effectively prevented from being recognized. The dummy start signal FLM_D may include four on-periods and four off-periods in one frame period, and the dummy stage ST_D may generate the dummy emission signal EM_D in response to the dummy start signal FLM_D. In an embodiment, for example, a rising edge at which the dummy emission signal EM_D is switched from the on-period to the off-period may be synchronized with a falling edge at which the dummy start signals FLM_D is switched from the off-period to the on-period.

The time points of the off-periods of the dummy emission signal EM_D may be substantially the same as the time points of the off-periods of each of the $k*n^{th}$ emission signals EM[n], EM[2n], and EM[3n], so that the load of the display panel 110 at the time points of the off-periods of each of the $k*n^{th}$ emission signals EM[n], EM[2n], and EM[3n]may be substantially the same as the load of the display panel 110 at the time points of the off-periods of each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1]. Accordingly, horizontal lines may not be generated in the $k*n^{th}$ pixel rows PR[n], PR[2n], and PR[3n].

In an embodiment, the time points of the off-periods of the dummy start signal FLM_D may be different from the time points of the off-periods of the emission start signal FLM. In an embodiment, for example, the time points of the off-periods of the dummy start signal FLM_D may precede the time points of the off-periods of the emission start signal FLM.

In an embodiment, widths W2 of the off-periods of the dummy start signal FLM_D may be different from widths W1 of the off-periods of the emission start signal FLM. In an embodiment, for example, the widths W2 of the off-periods of the dummy start signal FLM_D may be greater than the widths W1 of the off-periods of the emission start signal FLM.

Figure 7:
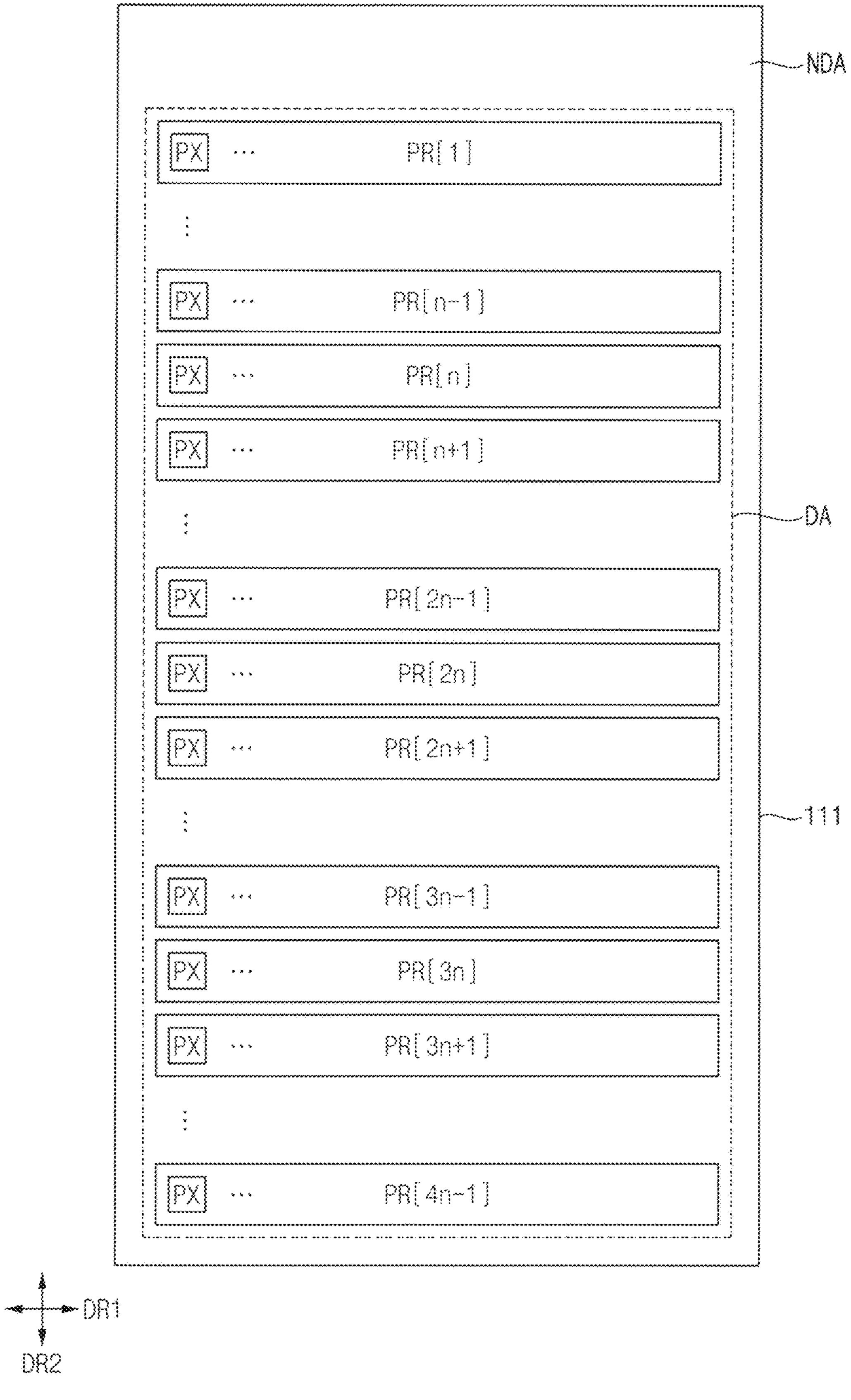
FIG. 7 is a plan view illustrating a display panel according to an alternative embodiment.
Figure 8:
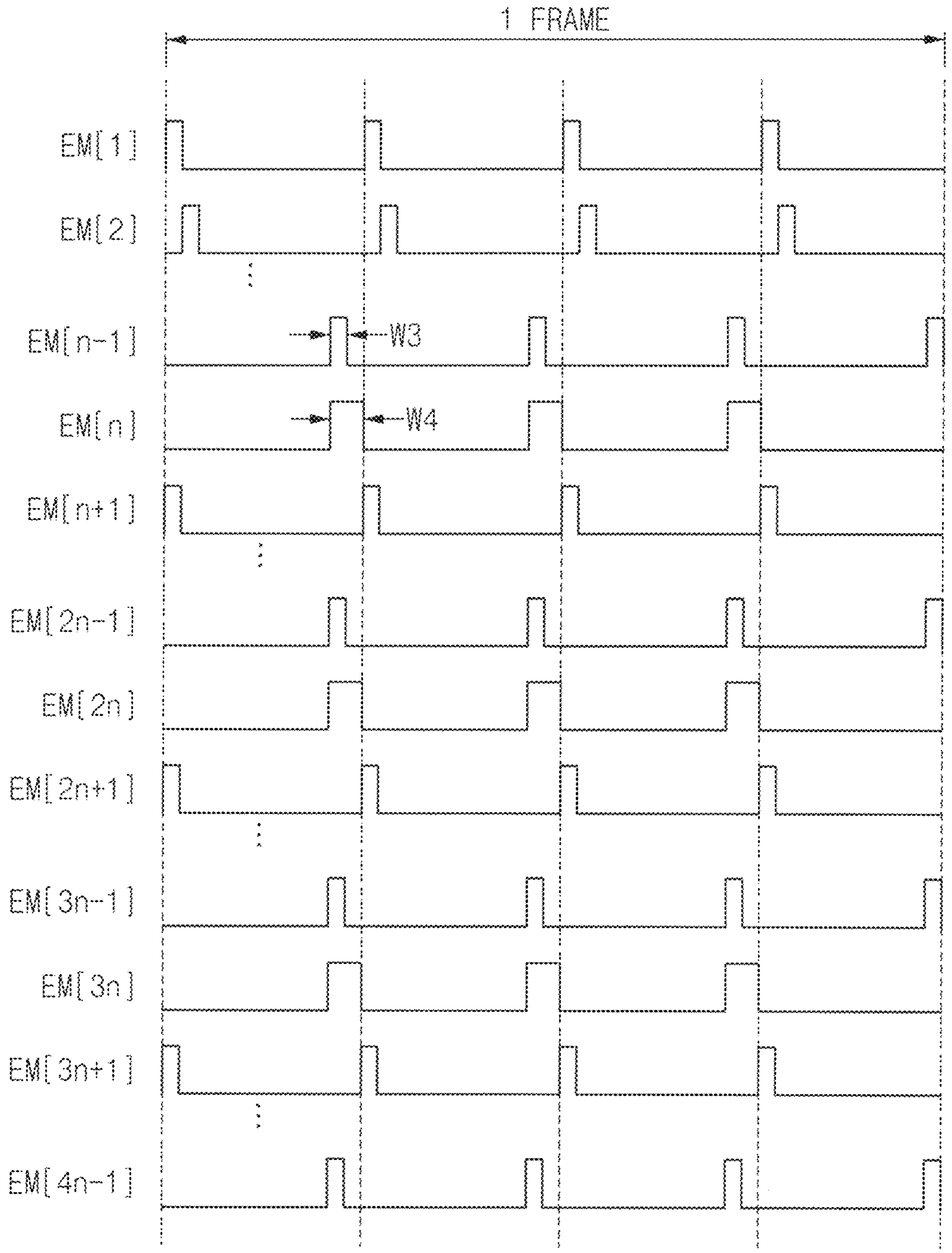
FIG. 8 is a timing diagram for describing emission signals according to an embodiment.

FIG. 7 is a plan view illustrating a display panel 111 according to an alternative embodiment. FIG. 8 is a timing diagram for describing emission signals EM[1]-EM[4n−1] according to an embodiment.

Hereinafter, with reference to FIGS. 7 and 8, an embodiment in which m is 4 (e.g., a case in which the emission signal EM includes four emission periods EP in one frame period, or the second case CASE2 in FIG. 3) will be mainly described, but the features described with reference to FIGS. 7 and 8 may be applied to other cases where m is 2, 3, or 5 or more. Further, any repetitive detailed descriptions of the same or like components of the display panel 111 in FIGS. 7 and 8, as those of the display panel 110 described above with reference to FIGS. 4 to 6, will be omitted or simplified.

Referring to FIG. 7, an embodiment of the display panel 111 may include a display area DA and a non-display area NDA. The display panel 110 may include first to $(4n-1)^{th}$ pixel rows PR[1]-PR[4n−1]. The first to $(4n-1)^{th}$ pixel rows PR[1]-PR[4n−1] may be disposed in the display area DA. In such an embodiment, as shown in FIG. 7, the display panel 111 may not include a dummy pixel row.

Referring to FIG. 8, $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1] having substantially the same shape and sequentially shifted in a predetermined time may be provided to $\{(k-1)*n+1\}^{th}$ to $(k*n-1)^{th}$ pixel rows PR[1]-PR[n−1], PR[n+1]-PR[2n−1], PR[2n+1]-PR[3n−1], and PR[3n+1]-PR[4n−1], respectively.

During one frame period, each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1] may include four off-periods, and each of $k*n^{th}$ emission signals EM[n], EM[2n], and EM[3n] may include three off-periods. When the number of the off-periods of each of the $k*n^{th}$ emission signals EM[n], EM[2n], EM[3n] is different from the number of the off-periods of each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1], a load of the display panel 111 at time points of the off-periods of each of the $k*n^{th}$ emission signals EM[n], EM[2n], and EM[3n] may be different from a load of the display panel 111 at time points of the off-periods of each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1]. Accordingly, horizontal lines generated in the $k*n^{th}$ pixel rows PR[n], PR[2n], and PR[3n] may be recognized.

In an embodiment, widths W4 of the off-periods of each of the $k*n^{th}$ emission signals EM[n], EM[2n], and EM[3n] respectively provided to the $k*n^{th}$ pixel rows PR[n], PR[2n], and PR[3n] are different from widths W3 of the off-periods of each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1] respectively provided to remaining pixel rows PR[1]-PR[n−1], PR[n+1]-PR[2n−1], PR[2n+1]-PR[3n−1], and PR[3n+1]-PR[4n−1] other than the $k*n^{th}$ pixel rows PR[n], PR[2n], PR[3n] among the first to $(4n-1)^{th}$ pixel rows PR[1]-PR[4n−1] such that the horizontal lines may be effectively prevented from being recognized. In an embodiment, the widths W4 of the off-periods of each of the $k*n^{th}$ emission signals EM[n], EM[2n], and EM[3n] may be greater than the widths W3 of the off-periods of each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1]. In an embodiment, for example, a ratio of the widths W4 of the off-periods of each of the $k*n^{th}$ emission signals EM[n], EM[2n], and EM[3n] to the widths W3 of the off-periods of each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1] may be about 4:3.

In an embodiment, the widths W4 of the off-periods of each of the $k*n^{th}$ emission signals EM[n], EM[2n], and EM[3n] may be greater than the widths W3 of the off-periods of each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1], so that the load of the display panel 111 at the time points of the off-periods of each of the $k*n^{th}$ emission signals EM[n], EM[2n], and EM[3n] may be substantially the same as the load of the display panel 111 at the time points of the off-periods of each of the $\{(k-1)*n+1\}^{th}$ to $(k*n-1)^{th}$ emission signals EM[1]-EM[n−1], EM[n+1]-EM[2n−1], EM[2n+1]-EM[3n−1], and EM[3n+1]-EM[4n−1]. Accordingly, horizontal lines may not be generated in the $k*n^{th}$ pixel rows PR[n], PR[2n], and PR[3n].

Figure 9:
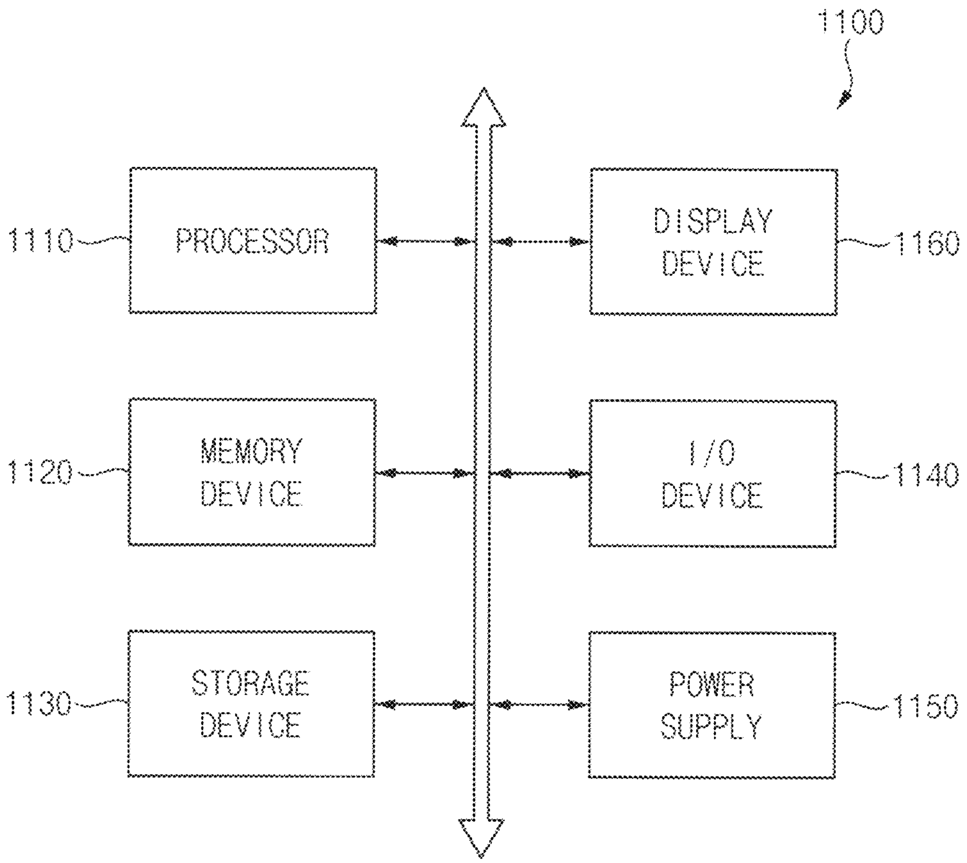
FIG. 9 is a block diagram illustrating an electronic apparatus including a display device according to an embodiment.

FIG. 9 is a block diagram illustrating an electronic apparatus 1100 including a display device 1160 according to an embodiment.

Referring to FIG. 9, an embodiment of the electronic apparatus 1100 may include a processor 1110, a memory device 1120, a storage device 1130, an input/output ("I/O") device 1140, a power supply 1150, and a display device 1160. The electronic apparatus 1100 may further include a plurality of ports for communicating with a video card, a sound card, a memory card, a universal serial bus ("USB") device, etc.

The processor 1110 may perform particular calculations or tasks. In an embodiment, the processor 1110 may be a microprocessor, a central processing unit ("CPU"), or the like. The processor 1110 may be coupled to other components via an address bus, a control bus, a data bus, or the like. In an embodiment, the processor 1110 may be coupled to an extended bus such as a peripheral component interconnection ("PCI") bus.

The memory device 1120 may store data for operations of the electronic apparatus 1100. In an embodiment, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAMV") device, a nano floating gate memory ("NFGM") device, a polymer random access memory ("PoRAM") device, a magnetic random access memory ("MIRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a CD-ROM device, or the like. The I/O device 1140 may include an input device such as a keyboard, a keypad, a touchpad, a touch-screen, a mouse device, etc., and an output device such as a speaker, a printer, etc. The power supply 1150 may supply a power required for the operation of the electronic apparatus 1100. The display device 1160 may be coupled to other components via the buses or other communication links.

In the display device 1160, as described above with reference to FIGS. 1-8, although the number of the off-periods of the emission signal provided to some pixel rows are different from the number of the off-periods of the emission signal provided to the remaining pixel rows, the emission signal may be additionally provided to the dummy pixel row, or the widths of the off-periods of the emission signal provided to some pixel rows may be adjusted, so that degradation of image quality of the display device 1160 may be effectively prevented.

The display device according to embodiments may be applied to a display device included in a computer, a notebook, a mobile phone, a smart phone, a smart pad, a portable media player ("PMP"), a personal digital assistance ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:

a display panel including first to $(m*n-1)^{th}$ pixel rows and a dummy pixel row, wherein each of m and n is a natural number greater than or equal to 2;

an emission driver which provides emission signals to the first to $(m*n-1)^{th}$ pixel rows and the dummy pixel row; and a timing controller which provides an emission start signal and a dummy start signal to the emission driver;

wherein each of the emission signals includes a plurality of on-periods and a plurality of off-periods in one frame period, and wherein time points of off-periods of an emission signal provided to the dummy pixel row are the same as time points of off-periods of an emission signal provided to each of $k*n^{th}$ pixel rows, wherein k is a natural number greater than or equal to 1 and less than m.

2. The display device of claim 1, wherein the first to $(m*n-1)^{th}$ pixel rows are disposed in a display area of the display panel, and wherein the dummy pixel row is disposed in a non-display area of the display panel.

3. The display device of claim 2, wherein the dummy pixel row is adjacent to the first pixel row.

4. The display device of claim 1, wherein each of the first to $(m*n-1)^{th}$ pixel rows includes a pixel including a light emitting element, and wherein the light emitting element emits light during the on-periods and does not emit light during the off-periods.

5. The display device of claim 1, wherein each of the emission signals includes a plurality of emission periods in the one frame period, and wherein each of the emission periods includes one of the on-periods and one of the off-periods.

6. The display device of claim 5, wherein each of the emission signals includes four emission periods in the one frame period.

7. The display device of claim 5, wherein each of the emission signals includes two emission periods in the one frame period.

8. The display device of claim 5, wherein each of the emission signals includes eight emission periods in the one frame period.

9. The display device of claim 1, wherein a voltage level of each of the emission signals in the off-periods is higher than a voltage level of each of the emission signals in the on-periods.

10. The display device of claim 1, wherein the emission driver includes first to $(m*n-1)^{th}$ stages connected to the first to $(m*n-1)^{th}$ pixel rows, respectively, and a dummy stage connected to the dummy pixel row, and wherein the timing controller provides the emission start signal to the first stage and provides the dummy start signal to the dummy stage.

11. The display device of claim 1, wherein each of the emission start signal and the dummy start signal includes a plurality of on-periods and a plurality of off-periods in the one frame period, and wherein time points of off-periods of the dummy start signal are different from time points of off-periods of the emission start signal.

12. The display device of claim 11, wherein widths of the off-periods of the dummy start signal are greater than widths of the off-periods of the emission start signal.

13. A display device, comprising:

a display panel including first to $(m*n-1)^{th}$ pixel rows, wherein each of m and n is a natural number greater than or equal to 2;

an emission driver which provides emission signals to the first to $(m*n-1)^{th}$ pixel rows; and a timing controller which provides an emission start signal to the emission driver;

wherein each of the emission signals includes a plurality of on-periods and a plurality of off-periods in one frame period, and wherein widths of off-periods of an emission signal provided to each of $k*n^{th}$ pixel rows are different from widths of off-periods of an emission signal provided to each of remaining pixel rows other than the $k*n^{th}$ pixel rows among the first to $(m*n-1)^{th}$ pixel rows, wherein k is a natural number greater than or equal to 1 and less than m.

14. The display device of claim 13, wherein the widths of the off-periods of the emission signal provided to each of the $k*n^{th}$ pixel rows are greater than the widths of the off-periods of the emission signal provided to each of the remaining pixel rows.

15. The display device of claim 13, wherein each of the first to $(m*n-1)^{th}$ pixel rows includes a pixel including a light emitting element, and wherein the light emitting element emits light during the on-periods and does not emit light during the off-periods.

16. The display device of claim 13, wherein each of the emission signals includes a plurality of emission periods in the one frame period, and wherein each of the emission periods includes one of the on-periods and one of the off-periods.

17. The display device of claim 16, wherein each of the emission signals includes four emission periods in the one frame period.

18. The display device of claim 16, wherein each of the emission signals includes two emission periods in the one frame period.

19. The display device of claim 16, wherein each of the emission signals includes eight emission periods in the one frame period.

20. The display device of claim 13, wherein a voltage level of each of the emission signals in the off-periods is higher than a voltage level of each of the emission signals in the on-periods.

* * * * *